United States Patent
Im (10) Patent No.: US 8,812,992 B2
(45) Date of Patent: Aug. 19, 2014

(54) TOUCH SCREEN PANEL TO INPUT MULTI-DIMENSION VALUES AND METHOD FOR CONTROLLING TOUCH SCREEN PANEL

(75) Inventor: Ki-hong Im, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1177 days.

(21) Appl. No.: 12/174,013

(22) Filed: Jul. 16, 2008

(65) Prior Publication Data

US 2009/0066643 A1 Mar. 12, 2009

(30) Foreign Application Priority Data

Sep. 7, 2007 (KR) .................. 10-2007-0091105

(51) Int. Cl.
*G06F 3/048* (2013.01)
*G06F 3/033* (2013.01)

(52) U.S. Cl.
USPC ........... 715/863; 715/764; 715/771; 715/773; 715/799; 715/856

(58) Field of Classification Search
USPC ......... 715/200, 700, 716, 764, 771, 773, 780, 715/781, 783, 799, 800, 856–858, 863, 864, 715/866
See application file for complete search history.

(56) References Cited

U.S. PATENT DOCUMENTS

| | | | | |
|---|---|---|---|---|
| 5,212,643 A * | 5/1993 | Yoshida ................ | 701/455 |
| 5,798,766 A * | 8/1998 | Hayashi et al. ........... | 345/595 |
| 5,923,388 A * | 7/1999 | Kurashima et al. ........... | 349/23 |
| 6,067,073 A * | 5/2000 | Rae-Smith et al. ........... | 345/589 |
| 6,262,717 B1 * | 7/2001 | Donohue et al. .............. | 345/173 |
| 6,310,613 B1 * | 10/2001 | Tanaka et al. ............... | 345/173 |
| 6,765,557 B1 * | 7/2004 | Segal et al. .................. | 345/173 |
| 6,819,721 B1 * | 11/2004 | Kobayashi et al. .......... | 375/298 |
| 7,755,615 B2 * | 7/2010 | Foo et al. ..................... | 345/173 |
| 2002/0186897 A1 * | 12/2002 | Kim et al. ..................... | 382/288 |
| 2004/0021681 A1 * | 2/2004 | Liao .............................. | 345/702 |
| 2004/0130537 A1 * | 7/2004 | Kong et al. .................. | 345/173 |
| 2005/0017957 A1 * | 1/2005 | Yi ................................. | 345/173 |
| 2006/0026521 A1 | 2/2006 | Hotelling et al. | |
| 2006/0097991 A1 * | 5/2006 | Hotelling et al. ............ | 345/173 |
| 2006/0101354 A1 * | 5/2006 | Hashimoto et al. ........... | 715/863 |
| 2006/0161871 A1 * | 7/2006 | Hotelling et al. ............. | 715/863 |

(Continued)

FOREIGN PATENT DOCUMENTS

| | | |
|---|---|---|
| JP | 2001-101163 | 4/2001 |
| JP | 2004-126762 | 4/2004 |
| KR | 10-2006-0009706 A | 2/2006 |

OTHER PUBLICATIONS

Erco's FLTK Cheat Page, Feb. 4, 2006, 3 pages.*

(Continued)

*Primary Examiner* — Ryan Pitaro
*Assistant Examiner* — Yongjia Pan
(74) *Attorney, Agent, or Firm* — Staas & Halsey LLP (57) ABSTRACT

A touch screen panel to input multi-dimension values and a method of controlling the touch screen panel are provided. In the touch screen panel, a touch screen unit displays a multi-dimensional coordinate system, and senses whether a certain point of the multi-dimensional coordinate system is touched, a control unit calculates coordinates of the touched point if the touched point is sensed, and a coordinate display unit displays values of the calculated coordinates.

26 Claims, 5 Drawing Sheets

(56) References Cited

U.S. PATENT DOCUMENTS

| | | | |
|---|---|---|---|
| 2006/0190836 A1* | 8/2006 | Ling Su et al. | 715/773 |
| 2006/0238518 A1* | 10/2006 | Westerman et al. | 345/173 |
| 2007/0086825 A1* | 4/2007 | Min | 400/472 |
| 2008/0102948 A1* | 5/2008 | Kogo | 463/31 |
| 2008/0106526 A1* | 5/2008 | Chen | 345/174 |
| 2008/0168382 A1* | 7/2008 | Louch et al. | 715/781 |
| 2009/0073136 A1* | 3/2009 | Choi | 345/173 |

OTHER PUBLICATIONS

Korean Office Action issued Sep. 23, 2013 in corresponding Korean Application No. 10-2007-0091105.

Korean Office Action issued Mar. 25, 2014 in corresponding Korean Patent Application 10-2007-0091105.

* cited by examiner

TOUCH SCREEN PANEL TO INPUT MULTI-DIMENSION VALUES AND METHOD FOR CONTROLLING TOUCH SCREEN PANEL

CROSS-REFERENCE TO RELATED APPLICATION

This application claims all benefits accruing under 35 U.S.C. §119 from Korean Patent Application No. 2007-91105, filed on Sep. 7, 2007, in the Korean Intellectual Property Office, the entire disclosure of which is incorporated herein by reference.

BACKGROUND OF THE INVENTION

1. Field of the Invention

Aspects of the present invention relate to a touch screen panel to input multi-dimension values and a method for controlling the touch screen panel, and more particularly, to a touch screen panel which concurrently inputs multi-dimension values by using a multi-dimensional coordinate system to input the multi-dimension values, and a method for controlling the touch screen panel.

2. Description of the Related Art

Figure 1:
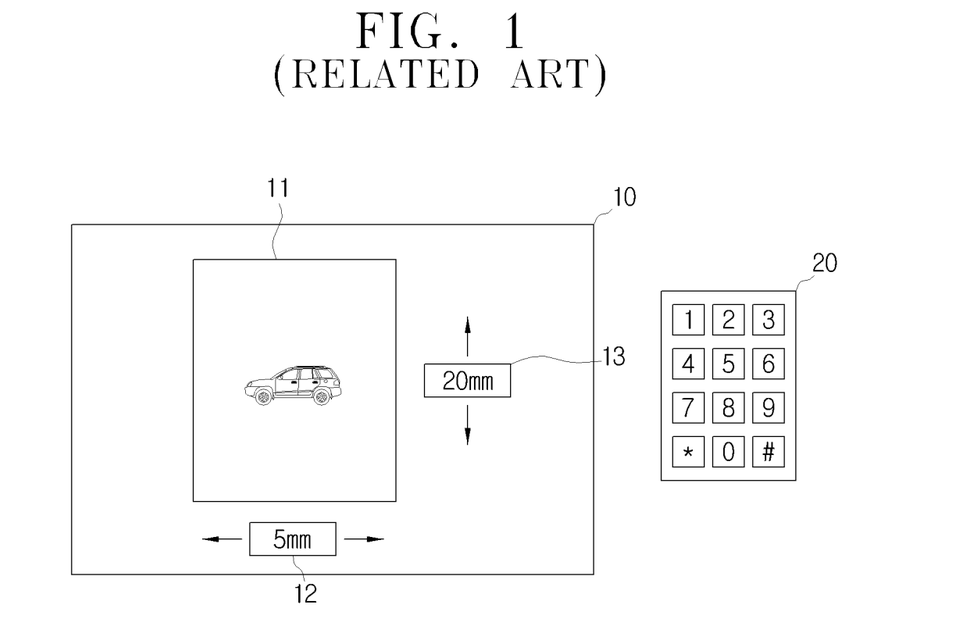
FIG. 1 is a drawing provided to describe a typical method of inputting values to move an image.

In electronic devices, a location of an image on a screen can be adjusted by inputting values using a touch screen panel or a keypad. FIG. 1 is a drawing provided to describe a typical method for inputting the values using a touch screen panel. A touch screen panel 10 includes a first section 11 for displaying an image, a second section 12 for inputting a numerical value representing a horizontal movement of the image, and a third section 13 for inputting a numerical value representing a vertical movement of the image.

If a user wishes to move the image that is displayed on the first section 11 to the right 10 mm and down 20 mm, the user must touch the second section 12 so that a cursor moves to the second section 12. Subsequently, the user must input a desired numerical value of 10 mm using a number pad 20, and then must touch a right arrow →. As a result, the image moves 10 mm to the right.

In addition, the user must touch the third section 13 so that the cursor moves to the third section 13. Subsequently, the user must input 20 mm using the number pad 20, and then must touch a down arrow ↓. As a result, the image moves down 20 mm. If the new location of the image is not where the user wants it, the user repeats the above process.

If the user moves the image in the typical way, the user must use the touch panel and the keypad together, which is both complicated and inconvenient. In particular, if the image is moved up, down, right and left many times, the user must input values and perform the selection by touch repeatedly, reducing user convenience in manipulating the image.

SUMMARY OF THE INVENTION

Aspects of the present invention relate to a touch screen panel on which multi-dimension values can be input concurrently, and a method for controlling the touch screen panel.

Additional aspects and/or advantages of the invention will be set forth in part in the description which follows and, in part, will be obvious from the description, or may be learned by practice of the invention.

According to example embodiments of the present invention, there is provided a touch screen panel to input multi-dimension values, including a touch screen unit which displays a multi-dimensional coordinate system, and senses a certain point on the multi-dimensional coordinate system which is touched by a user, a control unit which calculates coordinates of the touched point, and a coordinate display unit which provides a visual display of values of the calculated coordinates.

According to example embodiments of the present invention, if the touched point is touched by the user for a period longer than a reference time period, the control unit increases the values of the coordinates corresponding to the touched point.

According to example embodiments of the present invention, the control unit controls a display of the increased values of the coordinates at certain time intervals.

According to example embodiments of the present invention, the control unit calculates the increased values of the calculated coordinates by multiplying the values of the calculated coordinates by (N+1) at the certain time intervals, wherein N is a number of times the certain time interval elapses.

According to example embodiments of the present invention, the multi-dimensional coordinate system is a multi-dimensional coordinate system comprising a horizontal axis and a vertical axis.

According to example embodiments of the present invention, the touch screen panel further includes an image display unit which provides a visual display of an image, wherein the control unit operates the image display unit to shift and display an image at a location thereof that corresponds to the values of the calculated coordinates.

According to example embodiments of the present invention, the touch screen panel further includes a text display unit which provides a visual display of a cursor and text, wherein the control unit operates the text display unit to display the cursor at a location thereof that corresponds to the calculated coordinates and enable inputting of the text.

According to another example embodiment of the present invention, there is provided a method of inputting multi-dimension values in a touch screen panel for displaying a multi-dimensional coordinate system, the method including sensing a certain point on the multi-dimensional coordinate system that is touched by a user, calculating coordinates of the touched point, and displaying values of the calculated coordinates.

According to example embodiments of the present invention, in the sensing of the certain point, if the touched point is touched by the user for a period longer than a reference time period, the values of the calculated coordinates increases corresponding to an amount of time that elapses.

According to example embodiments of the present invention, in the calculation of the coordinates, the increased value of the calculated coordinates are calculated by multiplying the values of the calculated coordinates by (N+1) at the certain time intervals, wherein N is a number of times the certain time interval elapses.

According to example embodiments of the present invention, the method further includes shifting and displaying an image at a location that corresponds to values of the calculated coordinates.

According to example embodiments of the present invention, the method further includes displaying a cursor at a location corresponding to the calculated coordinates on a display to input text, and displaying input text from the location of the displayed cursor.

According to example embodiments of the present invention, a touch screen panel to receive input by touch includes an input portion to provide visual display of a coordinate system and to receive selection of a position on the coordinate system by touch input; an image display portion to provide visual display of a predetermined image at a position thereof corresponding to the selected position on the coordinate system; and a coordinate display portion to provide visual display of coordinate values of the selected position.

According to example embodiments of the present invention, a method of receiving input by touch using a touch screen panel, includes receiving a selection by touch input of a position on a coordinate system displayed on an input portion of the touch screen panel device; displaying a predetermined image at a position of an image display portion of the a touch screen panel device that corresponds to the selected position on the coordinate system; and displaying coordinate values of the selected position on a coordinate display portion of the touch screen panel device.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

Throughout the drawings, like reference numerals will be understood to refer to like parts, components, and/or structures.

DETAILED DESCRIPTION OF THE EMBODIMENTS

Reference will now be made in detail to embodiments of the present invention, examples of which are illustrated in the accompanying drawings, wherein like reference numerals refer to the like elements throughout. The example embodiments are described below in order to explain the present invention by referring to the figures.

Figure 2:
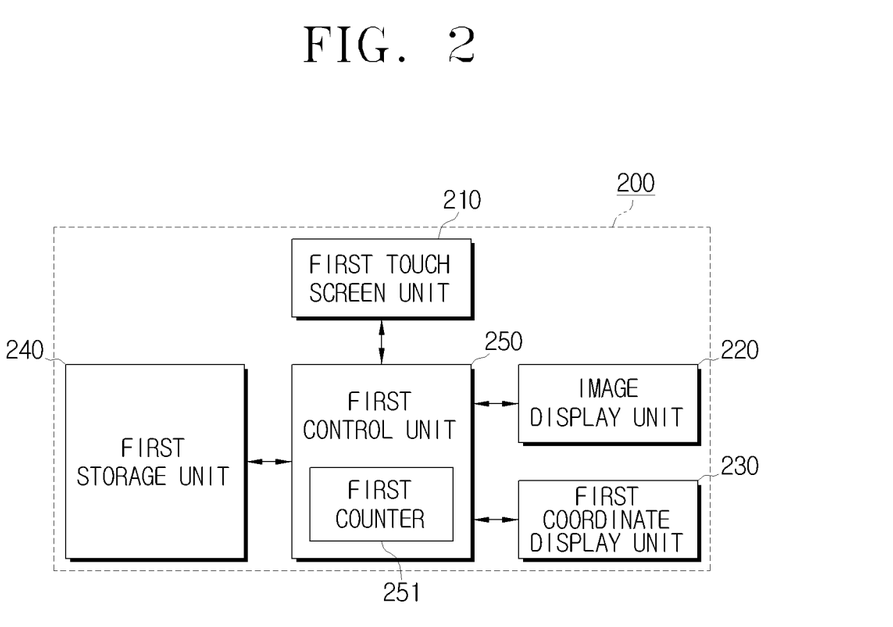
FIG. 2 is a block diagram of a first screen panel capable of a multi-dimensional input according to a first example embodiment of the present invention.

FIG. 2 is a block diagram of a first touch screen panel capable of a multi-dimensional input according to a first example embodiment of the present invention. The first touch screen panel 200 includes a first touch screen unit 210, an image display unit 220, a first coordinate display unit 230, a first storage unit 240, and a first control unit 250.

The first touch screen panel 200 is a panel on which a user can select manipulation buttons, including a plurality of key buttons and number buttons, by touch. The first touch screen panel 200 may be applied to various devices, such as image forming apparatuses, portable terminal devices, monitors, and automated teller machines to name a few examples.

The first touch screen panel 200 receives, input regarding a distance to move an image displayed on the image display unit 220, the location to input a text on the image display unit 220, and so on, in a multi-dimensional input manner. For example, the first touch screen panel 200 may simultaneously receive coordinates of a horizontal axis and a vertical axis (that is, an x-axis and a y-axis) by touch. In other words, the first touch screen panel 200 may provide a two-dimensional input in a simultaneous manner by providing coordinates of the horizontal axis and the vertical axis simultaneously by a single touch thereof. In various example embodiments, a multi-dimensional input refers to a single input that provides a plurality of independent information or values. In example embodiments of the present invention, the multi-dimensional input is implemented as a single input that provides a plurality of coordinates or values that may be independent, which refers to coordinates or values that are not determined by one another. For example, the multi-dimensional input may input multi-dimensional values, including an x-axis coordinate, a y-axis coordinate, and/or a time value.

The first touch screen unit 210 is an input device designed to replace manipulation buttons such as a keypad or a number pad, so that a user can request a desired operation by contacting (or touching) the first touch screen unit 210 with his or her hands, or with another object, such as a touch pen. To this end, the first touch screen unit 210 displays a graphic user interface (GUI) corresponding to manipulation buttons, and the user touches the GUI manipulation buttons to request desired operation, or for various input.

In particular, when the user wishes to simultaneously input multi-dimension values, the first touch screen unit 210 displays a multi-dimensional coordinate system. Accordingly, the first touch screen unit 210 senses whether the user touches a certain location on the multi-dimensional coordinate system. In various example embodiments, the certain location is defined by multi-dimension values corresponding to the multi-dimensional coordinate system.

In an example embodiment, the first touch screen unit 210 may be implemented with a screen consisting of a glass (lower plate) and a film (upper plate) bonded with a transparent conductive film (indium tin oxide (ITO) film). If the user touches a certain location of the first touch screen unit 210, the upper plate and the lower plate of the touched location contact each other. The first touch screen unit 210 recognizes the contact of the upper plate and the lower plate, and transmits coordinates of the touched location to the first control unit 250 as an electrical signal. As a result, the coordinates of the touched location are calculated. This is merely an example, and the first touch screen unit 210 can also be implemented using other well-known devices and techniques.

In example embodiments, the multi-dimensional coordinate system is a graphic user interface (GUI) for simultaneously receiving a location to move the image. That is, coordinates are of a location to move the image to, and may be a two or more dimensional coordinate system. For example, the multi-dimensional coordinate system may have two-dimensional coordinates using a horizontal axis (x-axis) and a vertical axis (y-axis), or have three-dimensional coordinates using a horizontal axis (x-axis), a vertical axis (y-axis), and a third axis (z-axis). The third axis may be normal to the first two. In example embodiments, the multi-dimensional coordinate system may include Cartesian, polar, or other coordinates.

The image display unit 220 may display images downloaded from an attachable memory card (not shown), an external device, or images provided from a device (not shown) whereon the first touch screen panel 200 is mounted. For example, if the first touch screen panel 200 is mounted on a multifunction apparatus, an image generated using a scanner of the multifunction apparatus is displayed on the image display unit 220. In example embodiments, a multifunction apparatus may refer to an image forming device having functions of a scanner, photocopier, a printer, and a facsimile machine, for example.

The first coordinate display unit 230 displays each numerical value of coordinates calculated by the first control unit 250. That is, if the first control unit 250 calculates the coordinates of the touched location sensed by the first touch screen unit 210, the first coordinate display unit 230 displays each numerical value of the coordinates. If the coordinate system is two-dimensional, the first coordinate display unit 230 displays a numerical value 231 of the horizontal axis, and a numerical value 232 of the vertical axis, for example.

Figure 3:
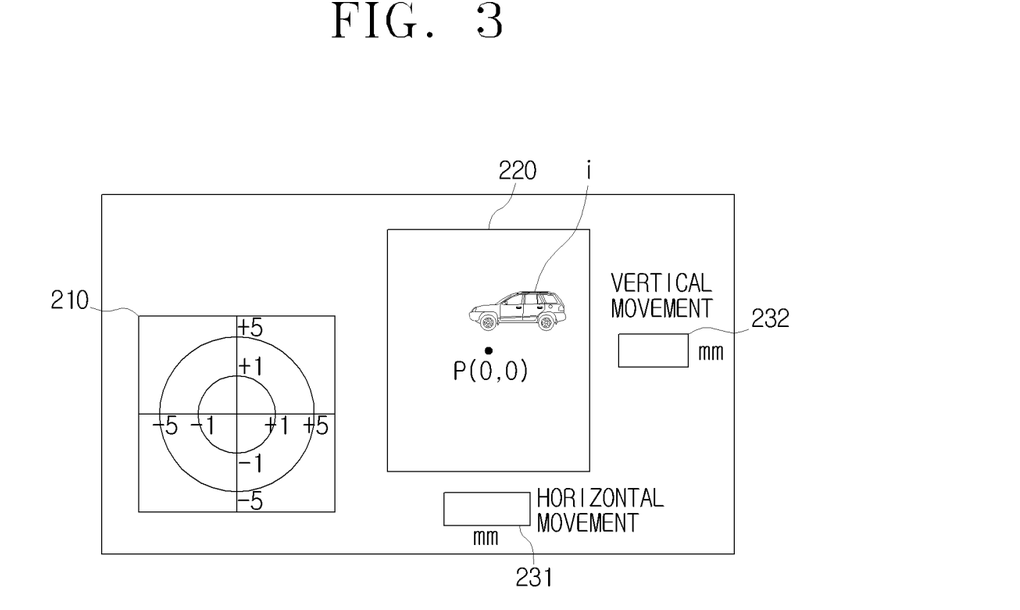
FIG. 3 illustrates an example of a first touch screen unit, a first coordinate display unit, and an image display unit of FIG. 2.

FIG. 3 illustrates an example of the first touch screen unit 210, the first coordinate display unit 230, and the image display unit 220 of FIG. 2. In FIG. 3, the first touch screen unit 210, the image display unit 220, and the first coordinate display unit 230 may be implemented as a single GUI on a single touch panel. That is, the single GUI may have a plurality of the elements on the single touch panel.

In the example embodiment of FIG. 3, the first touch screen unit 210 displays a two-dimensional coordinate system, and the image display unit 220 displays an image i, which is loaded from an external device, or provided from the device (not shown) whereon the first touch screen panel 200 is mounted. As shown, the image i is centered on the center point P(0, 0). In the case of the two-dimensional coordinate system, the first coordinate display unit 230 includes a first horizontal coordinate display unit 231, and a first vertical coordinate display unit 232. If the user touches a certain point on the two-dimensional coordinate system via the first touch screen unit 210, the first horizontal coordinate display unit 231 displays the horizontal distance of the touched point from the center point P as a numerical value, and the first vertical coordinate display unit 232 displays the vertical distance of the touched point from the center point P as a numerical value. The units used for the numerical values may be any of various units, such as mm, cm, or inches. In the example embodiment of FIG. 3, mm is shown.

If the multi-dimensional coordinate system is a two-dimensional plane coordinate system (i.e., Cartesian) that includes horizontal and vertical axes as shown in FIG. 3, the first touch screen unit 210 may include a plurality of circles or squares centered on the center point (0, 0) on the two-dimensional plane coordinate system to visually aid the user, in an example embodiment.

If used, the plurality of circles may be centered on the center point, may increase in radius by fixed amounts, and absolute values ($\Delta d1=1$ and $\Delta d2=4$ in FIG. 4) of differences between points or coordinates between points where each circle contacts the horizontal axis (x-axis) may increase incrementally. However, this is merely an example embodiment, so the present invention is not limited thereto. That is, the differences between the points may be in linearly changing increments or at non-linearly changing increments. The non-linearly changing increments will be described below.

For example, in FIG. 3, the absolute value of the horizontal coordinate where a circle closest to the center point (0, 0) contacts the horizontal axis is 1, the absolute value of the horizontal coordinate where a circle second closest to the center point (0, 0) contacts the horizontal axis is 5, not 2, and the absolute value of the horizontal coordinate where a circle third closest to the center point (0, 0) contacts the horizontal axis is 15, not 3. This allows the user to more precisely predict and touch the distance or location to move the image. In particular, since the absolute value of the difference between the horizontal coordinate of the closer circles and the center point (0, 0) is smaller than the absolute value of the difference between the horizontal coordinates of the outer circles, the user is afforded more range to adjust the movement of image, and can finely adjust the movement of the image using the circles closer to the center point (0,0). In other words, if the user wishes to move the image 0.1 mm to the right, the user can more easily touch the location 0.1 mm to the right using the closest circle, while if the user wishes to move the image 10 mm to the right, the user can more easily touch the location 10 mm to the right using the outer circles. Accordingly, the first touch screen unit 210 functions as an analog input device.

Returning to FIG. 2, the first storage unit 240 stores programs to operate the first touch screen panel 200, programs to display the multi-dimensional coordinate system, programs to display image data of the multi-dimensional coordinate system, and programs to measure a time duration a user touches a certain point on the multi-dimensional coordinate system.

The first control unit 250 controls the above described operations using the stored programs and the image data. That is, if power is supplied thereto, the first control unit 250 operates the first touch screen unit 210 to generate and display the multi-dimensional coordinate system, and operates the image display unit 220 to display the image so that the location of the image can be adjusted. The first touch screen unit 210 displays the multi-dimensional coordinate system using the image data stored in the first storage unit 240 as shown in FIG. 3, and the image display unit 220 displays an image i, shown as an automobile in this example embodiment.

Figure 4:
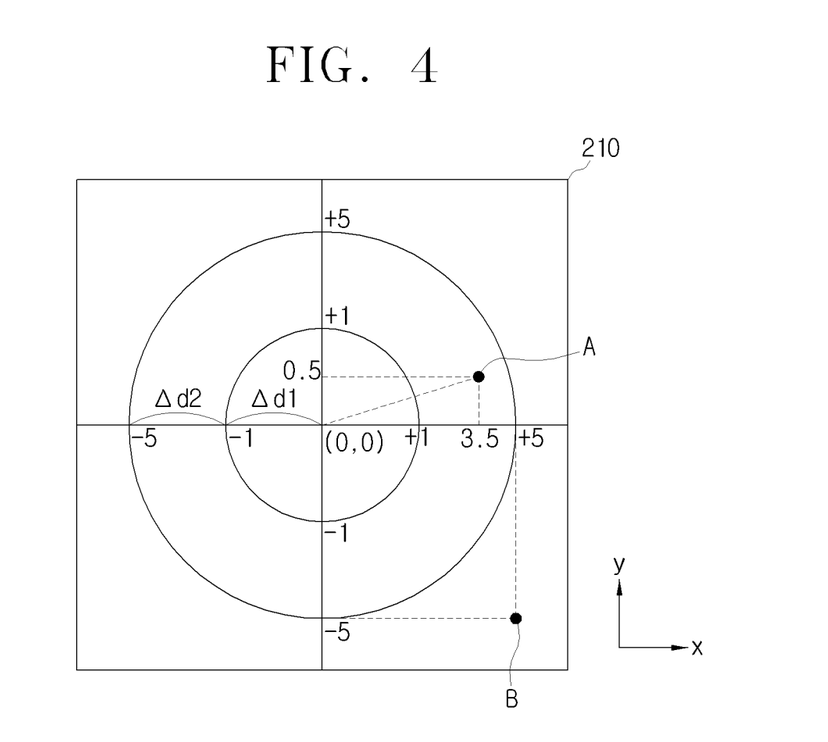
FIG. 4 is a drawing provided to describe a method of using a two-dimensional coordinate system of FIG. 3.

FIG. 4 is a drawing provided to describe a method of calculating coordinates when a user's touch is sensed on the multi-dimensional coordinate system of FIG. 3. If the user touches a certain point A on the displayed multi-dimensional coordinate system, the first touch screen unit 210 senses the point A, and the first control unit 250 calculates the coordinates of the sensed point A. If the multi-dimensional coordinate system is two-dimensional, the first control unit 250 calculates an x-coordinate and a y-coordinate of the point A. The first control unit 250 thereby acquires a horizontal variance $\Delta x$ and a vertical variance $\Delta y$ from a reference point (0,0). In FIG. 4, the $\Delta x$ is 3.5, and the $\Delta y$ is 0.5.

Figure 5A:
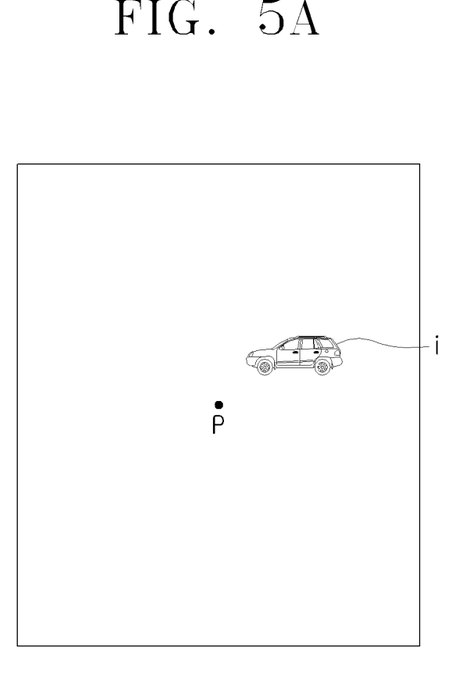
FIGS. 5A and 5B illustrate examples of moving an image according to coordinates calculated by a first control unit according to the first example embodiment of the present invention.

As shown in FIG. 2, the first control unit 250 includes a first counter 251 to measure a time that elapses while the certain point A is touched by the user. If the measured time is shorter than a reference time that is preset in the first storage unit 240, the first control unit 250 moves the image i horizontally by the $\Delta x$ equal to 3.5, and vertically by $\Delta y$ equal to 0.5, so that the image display unit 220 displays the image i as shown in FIG. 5A.

If the measured time exceeds the preset reference time, the first control unit 250 calculates accumulated coordinates which reflect a variance in the location of the image i during the measured time by increasing the number of coordinate values corresponding to the touched point A according to the length of time point A is touched. This is a similar concept to what occurs when a button on a joystick or a space bar on the keyboard is continuously pressed.

In more detail, if the user continues to touch the certain point (i.e., point A) for a period of time that is longer than the reference time, the first control unit 250 calculates accumulated coordinates (i.e., a multiple of the value of the touched point A) by increasing the calculated coordinate values (for touched point A) by a number of certain time intervals that elapses. That is, the first control unit 250 calculates the accumulated coordinates by multiplying the calculated coordinate values by (N+1) of the certain time intervals that elapses, where N is the number of the certain time interval which have elapsed. The reference time and the certain time interval may have the same or different values.

Figure 5B:
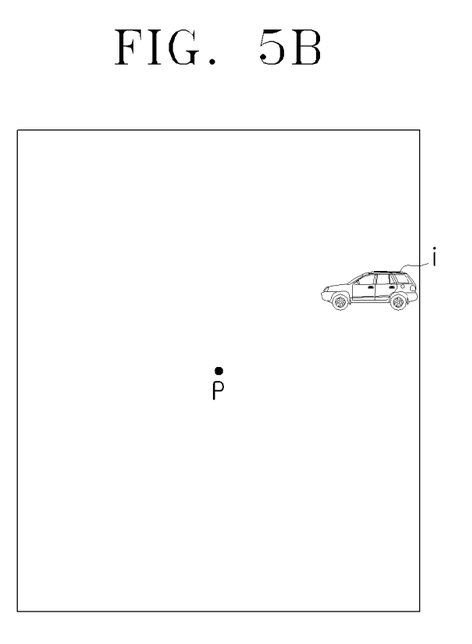

For example, if it is assumed that the reference time is 2 seconds and the certain time interval is 1 second, and if the user touches the certain point A for 5 seconds, the first control unit 250 multiplies coordinates (3.5, 0.5) of the point A by 4 so that the accumulated coordinates (14, 2.0) are acquired. This is because the first control unit 250 adds 3.5 and 0.5 to the base coordinates (3.5, 0.5) respectively at each time intervals of 1 second after the reference time of 2 seconds elapses, and the time interval passes three times to accumulate the base coordinates values (i.e., 3.5, 0.5) three more times. Accordingly, the first control unit 250 moves the image i displayed on the image display unit 220 a total $\Delta x$ of 14 to the right and a total $\Delta y$ of 2 upwards, so the image display unit 220 display the image i at (14,2) as shown in FIG. 5B.

In the above example embodiment, the location to which to move the image i displayed on the image display unit 220, that is, the horizontal and vertical movements, coordinates, or locations can be input simultaneously by touch. In addition, selecting a fine (or smaller) unit of distance such as mm, resulting in a precise movement of the image is enabled by setting the radial intervals between the circles displayed on the multi-dimensional coordinate system differently.

Figure 6:
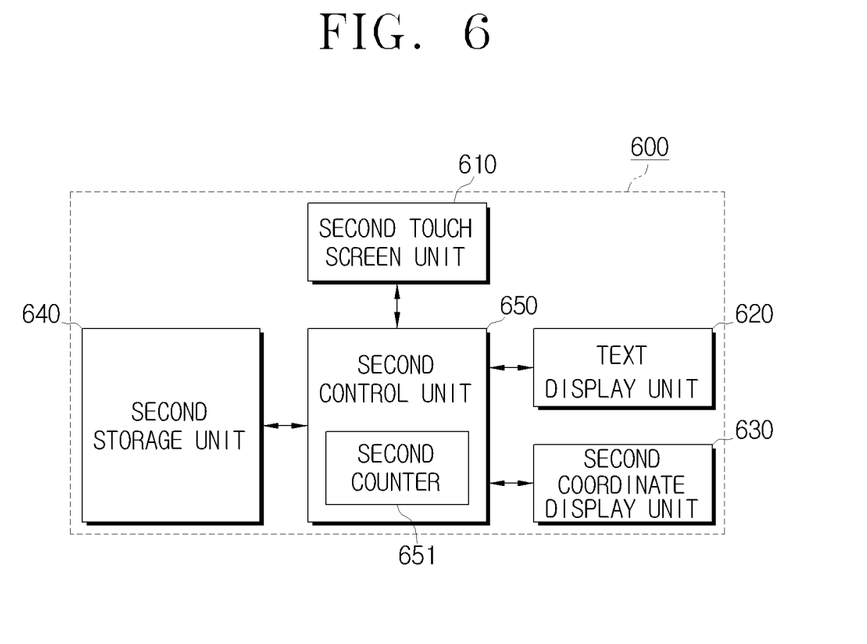
FIG. 6 is a block diagram of a second screen panel according to a second example embodiment of the present invention.

FIG. 6 is a block diagram of a second screen panel 600 according to a second example embodiment of the present invention. The second screen panel 600 includes a second touch screen unit 610, a text display unit 620, a second coordinate display unit 630, a second storage unit 640, and a second control unit 650.

The second screen panel 600 receives coordinates of a location at which a text is to be input on the text display unit 620 via a multi-dimensional input manner using the second touch screen unit 610. For example, the second screen panel 600 may simultaneously receive coordinates of the location on the horizontal axis and the vertical axis (that is, the x-axis and y-axis) by touch, and display a cursor at the touched location, so that text can be input from the location of the cursor.

The second touch screen unit 610, the second coordinate display unit 630, the second storage unit 640, and the second control unit 650 respectively have similar functions to the first touch screen unit 210, the first coordinate display unit 230, the first storage unit 240, and the first control unit 250 of FIG. 2. So, a detailed description thereof is not repeated.

The second touch screen unit 610 displays a multi-dimensional coordinate system as described in the first touch screen unit 210, and senses the location (for example, B in FIG. 4) touched by the user to display the cursor using a multi-dimensional coordinate system. The coordinates corresponding to the touched location B are calculated by the second control unit 650.

The second coordinate display unit 630 displays the numerical values of the coordinates of location B calculated by the second control unit 650. If the coordinate system is two-dimensional, the second coordinate display unit 630 displays a numerical value 631 of the horizontal axis, and a numerical value 632 of the vertical axis as shown in FIG. 7.

Figure 7:
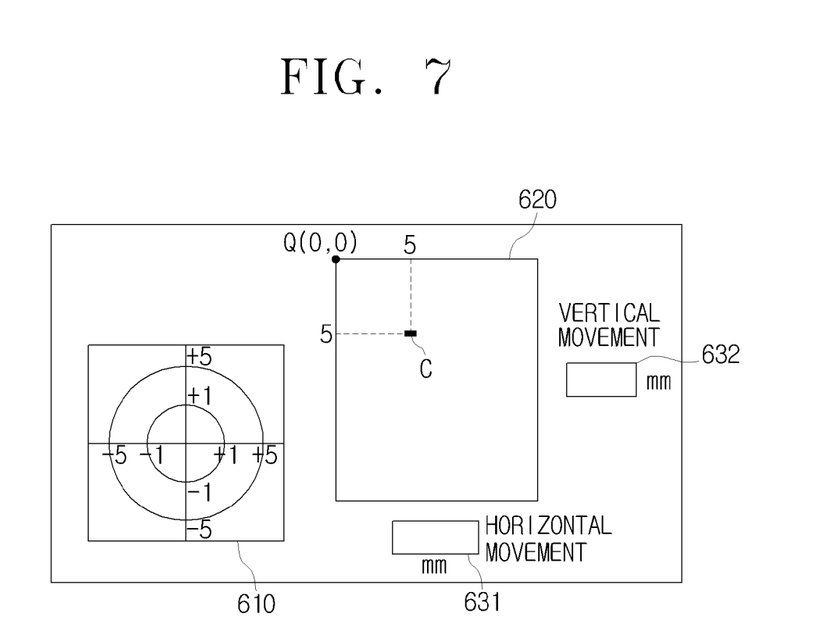
FIG. 7 illustrates an example of a second touch screen unit, a second coordinate display unit, and a text display unit of FIG. 6.

FIG. 7 illustrates an example of the second touch screen unit 610, the second coordinate display unit 630, and the text display unit 620 of FIG. 6. In FIG. 7, the second touch screen unit 610, the text display unit 620, and the second coordinate display unit 630 may be implemented as a single GUI on a single touch panel.

In the example embodiment of FIG. 6, the second touch screen unit 610 displays a two-dimensional coordinate system, and the text display unit 620 displays input text relative to a center point Q (0, 0). In the case of the two-dimensional coordinate system, the second coordinate display unit 630 includes a second horizontal coordinate display unit 631, and a second vertical coordinate display unit 632.

If the user touches a certain point B on the two-dimensional coordinate system via the second touch screen unit 610, the second horizontal coordinate display unit 631 displays the horizontal distance of point B from the center point Q as a numerical value, and the second vertical coordinate display unit 632 displays the vertical distance of the point B from the center point Q as a numerical value. The unit used for the numerical values may be any of various units, such as mm, cm, or inches. In the example embodiment of FIG. 7, mm is shown.

If the multi-dimensional coordinate system is a two-dimensional plane coordinate system that includes horizontal and vertical axes as shown in FIG. 7, the second touch screen unit 610 may include a plurality of circles or squares which are centered on a center point (0, 0) on the two-dimensional plane coordinate system to visually aid the user. Since the circles or squares have been given with reference to FIGS. 3 and 4, a detailed description thereof is not repeated here.

With reference to FIG. 4, if the second control unit 650 calculates the coordinates of the touched point B, the text display unit 620 displays a cursor at the location corresponding to the calculated coordinates. For example, if the reference point of the text display unit 620 is Q (0, 0) and the coordinates of the touched point B are (5, −5), the text display unit 620 displays a cursor C at the location corresponding to (5, 5) based on the reference point Q.

If the user inputs text using a keypad graphic user interface (GUI) (not shown) displayed by the second touch screen unit 610 or a plurality of separate key buttons on a physical keypad, the input text is displayed starting from the location of the cursor C.

Returning to FIG. 6, the second storage unit 640 stores programs to operate the second touch screen panel 600, programs to measure a time duration during which a user touches a certain point on the multi-dimensional coordinate system, and cursor image data.

The second control unit 650 operates the second touch screen unit 610 to generate and display the multi-dimensional coordinate system, and calculates the coordinates of the touched point B. Accordingly, the second control unit 650 acquires a horizontal variance $\Delta x$ and a vertical variance $\Delta y$ from a reference point (0,0). In FIG. 4, the $\Delta x$ and the $\Delta y$ are 5, for example.

As shown in FIG. 6, the second control unit 650 includes a second counter 651 to measure the time that elapses while the certain point B is touched by the user. If the measured time is shorter than a reference time preset in the second storage unit 640, the second control unit 650 moves the cursor the Δx equal to 5 to the right and the Δy equal to 5 downwards, so the text display unit 620 displays the cursor C as shown in FIG. 7.

If the measured time exceeds the preset reference time, the second control unit 650 calculates accumulated coordinates which reflect a variance in the location of the cursor C during the measured time by increasing the number of values of the coordinates corresponding to the touched point B according to the length of time point B is touched. This function is the same as the function of the first control unit 250, so a detailed description thereof is not repeated here.

In the above example embodiment, an initial location of the text to be displayed on the text display unit 620, that is, the horizontal and vertical movements, coordinates, or locations of the cursor C can be input simultaneously by touch. In addition, selecting a precise unit of distance, such as mm, resulting in precise movement of the cursor is enabled by setting the radial intervals between the circles displayed on the multi-dimensional coordinate system differently.

Figure 8:
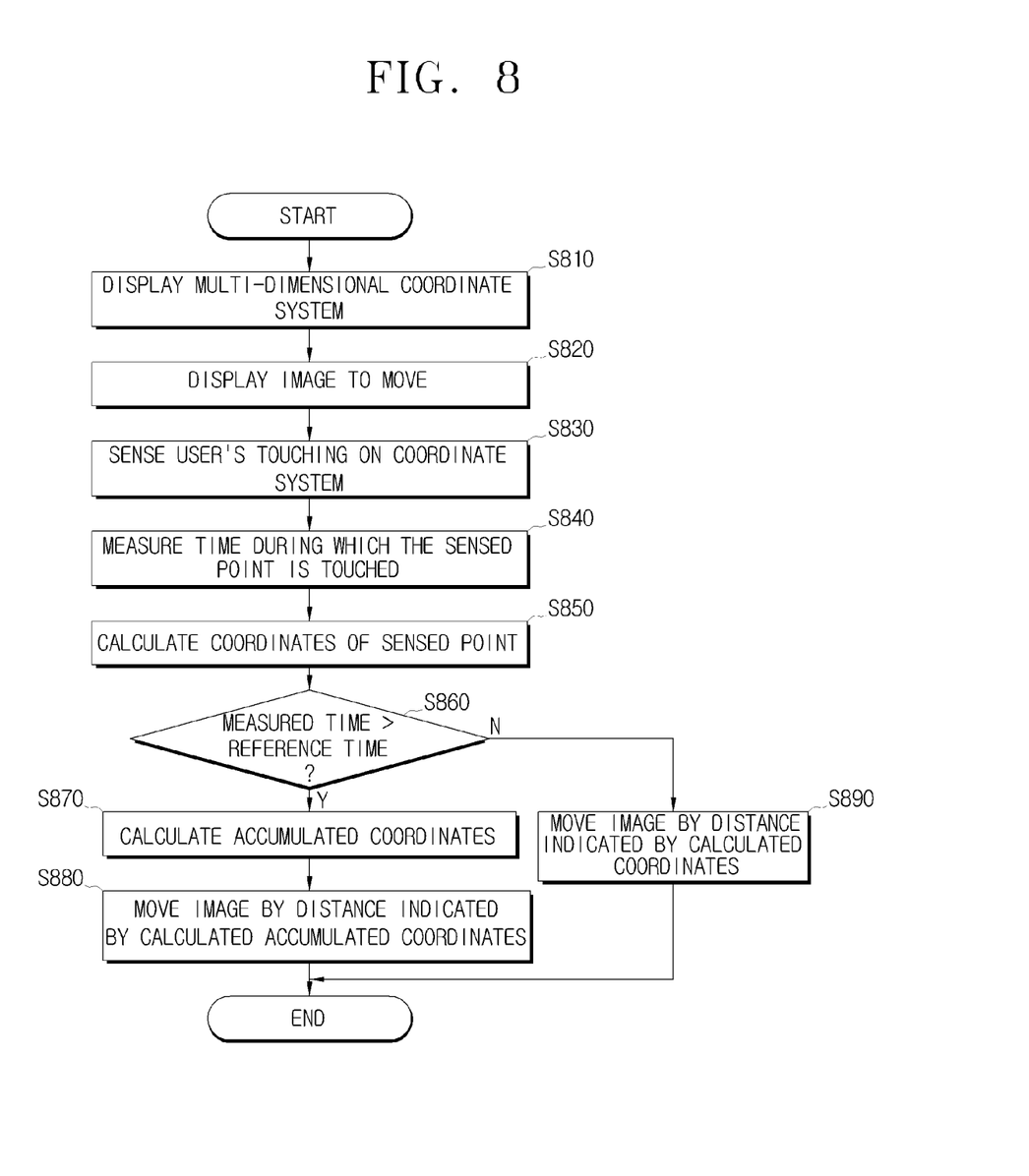
FIG. 8 is a flow chart to describe a method of inputting a multi-dimensional input to via a touch screen panel according to the first example embodiment of the present invention.

FIG. 8 is a flow chart describing a method of inputting multi-dimension values in a touch screen panel according to the first example embodiment of the present invention. A method of inputting multi-dimension values using the first touch screen panel 200 is described.

With reference to FIGS. 2 to 5B and FIG. 8, if power is supplied thereto, the first touch screen unit 210 displays a multi-dimensional coordinate system, for example, a two-dimensional plane coordinate system in operation S810. Then, the image display unit 220 displays an image provided from an external device (not shown) or a device (not shown) on which the first touch screen panel 200 in operation S820 is mounted.

For example, if the first touch screen panel 200 is mounted on a multi-function apparatus (not shown) having a scanning function, the image display unit 220 can display a scanned image, or an image transmitted from a computer to the multi-function apparatus. If the user wishes to change and print or store the location of the displayed image, the user can change the location using the two-dimensional plane coordinate system via the first touch screen unit 210.

In operation S830, if the user touches a certain point on the two-dimensional plane coordinate system, the first touch screen unit 210 senses the touched point, for example, point A shown in FIG. 4, and notifies the first control unit 250 of the sensed point. In addition, if the user stops touching the point, the first touch screen unit 210 notifies the first control unit 250 of a termination of contact.

In operation S840, the first control unit 250 measures the time from the initiation of contact to the termination of contact by way of the first touch screen unit 210, which are sensed in operation S830. In operation S850, the first control unit 250 calculates the coordinates of the touched point A.

If the counted or measured time exceeds a preset reference time in operation S860, the first control unit 250 calculates accumulated coordinates by increasing the values of the coordinates corresponding to the touched point A according to a set rule in operation S870. For example, if certain point A is touched for a period longer than the reference time, the first control unit 250 calculates the accumulated coordinates by increasing the values of the calculated coordinates at certain time intervals corresponding to the period that exceeds the reference time.

In operation S880, the first control unit 250 operates the image display unit 220 to move and display the image by the distance indicated by the accumulated coordinates calculated in operation S870. If the accumulated coordinates calculated in operation S870 are (20, 5), for example, the image display unit 220 moves the image 20 to the right and 5 up relative to a reference point, for example, a center point of the coordinate system.

Alternatively, if the time during which the user touches the point A is shorter than the preset reference time in operation S860, the first control unit 250 operates the image display unit 220 to move the image in operation S890 according to the coordinates calculated in operation S850. If the coordinates calculated in operation S850 are (3.5, 0.5), then the image display unit 220 moves the image 3.5 to the right and 0.5 up relative to the reference point.

During the process described with reference to FIG. 8, horizontal and vertical movement distances of the image are simultaneously input by the user's touch, and the image can be moved the calculated movement distances. A method of inputting an initial location of a cursor to input text with reference to FIG. 6 is similar to the method described with reference to FIG. 8, so detailed a description thereof is not repeated. However, in operation S830, if the user's touch is sensed on the coordinate system, the second control unit 650 calculates coordinates based on the sensed location (for example, B in FIG. 4), and displays a cursor on the location corresponding to the calculated coordinates of the text display unit 620. Subsequently, if a text is input, the text is displayed from the location of the cursor in order of input characters or symbols, for example.

The inventive concept of the present invention can be applied to all the devices adopting a touch screen input, and the first touch screen panel 200 in FIG. 2 and the second touch screen panel 600 in FIG. 6 can be combined to form a single touch screen panel.

As can be appreciated from the above description of a touch screen panel to input multi-dimension values and a method of controlling thereof, coordinates of horizontal and vertical axes can be simultaneously input. In other words, if the user touches a certain point on multi-dimensional coordinate system such as a two-dimensional plane coordinate system, the coordinates of the touched point are calculated and the calculated coordinates are applied as horizontal and vertical movement distances. Therefore, the user can input horizontal and vertical movement distances at the same time by a single touch.

Further, as can be appreciated from the above description of a touch screen panel to input multi-dimension values and a method of controlling thereof, an initial coordinates of the horizontal and vertical axes may be multiplied or accumulated based on the length of duration of the single touch. Accordingly, a value of an additional dimension is input thereby.

Furthermore, a plurality of circles centered on a center point of a multi-dimensional coordinate system is displayed with different incremental values so that the user can more finely and precisely select desired coordinates.

The method of claim 8 is also applicable to the second example embodiment of the present invention.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, in various example embodiments, the first touch screen unit 210, the image display unit 220, and the first coordinate display unit 230 may be implemented on a single touch screen panel. Further, the second touch screen unit 610, the text display unit 620, and the second coordinate display unit 630 may be implemented on a single touch screen panel as well. In other example embodiments, the image display unit 220 and the text display unit 620 may be used together or may be a single unit providing both image and text display. Accordingly, it is intended, therefore, that the present invention not be limited to the various example embodiments disclosed, but that the present invention includes all embodiments falling within the scope of the appended claims.

What is claimed is:

1. A touch screen panel to input multi-dimension values, comprising:
    a touch screen unit which displays a multi-dimensional coordinate system, and senses a certain point that is touched by a user on the multi-dimensional coordinate system;
    a control unit which calculates coordinates of the touched point relative to the multi-dimensional coordinate system; and
    a coordinate display unit which displays values of the calculated coordinates,
    wherein the multi-dimensional coordinate system is a graphic user interface (GUI) displayed on one portion of the touch screen panel to simultaneously receive a location to move an image, text or a cursor,
    wherein the multi-dimensional coordinate system is a two-dimensional plane coordinate system and the touch screen unit includes a plurality of circles or polygonal shapes centered on a center point on the two-dimensional plane coordinate system to visually aid the user, and
    wherein the plurality of circles or polygonal shapes centered on the center point of the multi-dimensional coordinate system is displayed with different incremental values to select desired coordinates.

2. The touch screen panel of claim 1, wherein, if the touched point is touched by the user for a period longer than a reference time period, the control unit increases the values of the calculated coordinates corresponding to an amount of time that elapses.

3. The touch screen panel of claim 2, wherein the control unit controls a visual display of the increased values of the coordinates at certain time intervals.

4. The touch screen panel of claim 2, wherein the control unit calculates the increased values of the calculated coordinates by multiplying the values of the calculated coordinates by (N+1) at the certain time intervals, wherein N is a number of times the certain time interval elapses.

5. The touch screen panel of claim 1, wherein the multi-dimensional coordinate system is a multi-dimensional coordinate system comprising a horizontal axis and a vertical axis.

6. The touch screen panel of claim 1, further comprising an image display unit which provides a visual display of an image, wherein the control unit operates the image display unit to shift and display an image at a location thereof that corresponds to the values of the calculated coordinates.

7. The touch screen panel of claim 6, wherein the image is initially displayed on a center point of the image display unit when the image is first loaded on the image display unit, and moves to the location that corresponds to the values of the calculated coordinates.

8. The touch screen panel of claim 1, further comprising a text display unit which provides a visual display of a cursor and text, wherein the control unit operates the text display unit to display the cursor at a location thereof that corresponds to the calculated coordinates and enable inputting of the text.

9. The touch screen panel of claim 1, further comprising an image display unit which provides a visual display of an image, wherein the touch screen unit does not overlap the image display unit.

10. A method of inputting multi-dimension values in a touch screen panel for displaying a multi-dimensional coordinate system, the method comprising:
    sensing a certain point that is touched by a user on the multi-dimensional coordinate system;
    calculating coordinates of the touched point relative to the multi-dimensional coordinate system; and
    displaying values of the calculated coordinates,
    wherein the multi-dimensional coordinate system is a graphic user interface (GUI) displayed on one portion of the touch screen panel to simultaneously receive a location to move an image, text or a cursor,
    wherein the multi-dimensional coordinate system is a two-dimensional plane coordinate system and the touch screen unit includes a plurality of circles or polygonal shapes centered on a center point on the two-dimensional plane coordinate system to visually aid the user, and
    wherein the plurality of circles or polygonal shapes centered on the center point of the multi-dimensional coordinate system is displayed with different incremental values to select desired coordinates.

11. The method of claim 10, wherein in the sensing of the certain point, if the touched point is touched by the user for a period longer than a reference time period, the values of the calculated coordinates increases corresponding to an amount of time that elapses.

12. The method of claim 11, wherein the values of the increased coordinates are displayed at certain time intervals.

13. The method of claim 11, wherein in the calculation of the coordinates, the increased values of the calculated coordinates are calculated by multiplying the values of the calculated coordinates by (N+1) at the certain time intervals, wherein N is a number of times the certain time interval elapses.

14. The method of claim 10, wherein the multi-dimensional coordinate system is a multi-dimensional coordinate system comprising a horizontal axis and a vertical axis.

15. The method of claim 10, further comprising shifting and displaying an image at a location that corresponds to values of the calculated coordinates.

16. The method of claim 15, wherein the image is initially displayed on a center point of the image display unit when the image is first loaded on the image display unit, and moves to the location that corresponds to the values of the calculated coordinates.

17. The method of claim 10, further comprising
    displaying a cursor at a location that corresponds to the calculated coordinates and enabling input of text; and
    displaying the input text from at a location of the displayed cursor.

18. The method of claim 10, wherein the multi-dimensional coordinate system does not overlap the image, text or cursor.

19. A touch screen panel device to receive input by touch, comprising:
    an input portion to display a coordinate system and to receive a position selected by touch input on the coordinate system;

an image display portion to display a predetermined image at a position thereof corresponding to the selected position on the coordinate system; and a coordinate display portion to display coordinate values of the selected position, wherein the coordinate system is a graphic user interface (GUI) displayed on one portion of the touch screen panel device to simultaneously receive a location to move an image, text or a cursor, wherein the coordinate system is a two-dimensional plane coordinate system and the input portion includes a plurality of circles or polygonal shapes centered on a center point on the two-dimensional plane coordinate system to visually aid the user, and wherein the plurality of circles or polygonal shapes centered on the center point of the coordinate system is displayed with different incremental values to select desired coordinates.

20. The touch screen panel device of claim 19, wherein the touch input determines a plurality of coordinates of the coordinate system by a single touch.

21. The touch screen panel device of claim 19, wherein the coordinate values of the selected position comprises at least two values that are independent of each other.

22. The touch screen panel device of claim 19, further comprising a controller to determine a time duration that elapses while the selection of the position on the coordinate system by touch input occurs to determine accumulated coordinate values of the selected position that corresponds to the amount of time that elapses.

23. The touch screen panel device of claim 19, wherein the input portion comprises a touch screen panel.

24. The touch screen panel device of claim 19, wherein the input portion, the image display portion, and the coordinate display portion are displayed as a single graphic user interface.

25. A method of receiving input by touch using a touch screen panel, comprising:

receiving a position selected by touch input on a coordinate system displayed on an input portion of the touch screen panel device;

displaying a predetermined image at a position of an image display portion of the a touch screen panel device that corresponds to the selected position on the coordinate system; and displaying coordinate values of the selected position on a coordinate display portion of the touch screen panel device, wherein the coordinate system is a graphic user interface (GUI) displayed on one portion of the touch screen panel device to simultaneously receive a location to move an image, text or a cursor, wherein the coordinate system is a two-dimensional plane coordinate system and the touch screen unit includes a plurality of circles or polygonal shapes centered on a center point on the two-dimensional plane coordinate system to visually aid the user, and wherein the plurality of circles or polygonal shapes centered on the center point of the coordinate system is displayed with different incremental values to select desired coordinates.

26. The method of claim 25, further comprising detecting a time duration that elapses while the selection of the position on the coordinate system by touch input occurs to determine accumulated coordinate values of the selected position that corresponds to the amount of time that elapses.

* * * * *

UNITED STATES PATENT AND TRADEMARK OFFICE
CERTIFICATE OF CORRECTION

PATENT NO.        : 8,812,992 B2
APPLICATION NO.   : 12/174013
DATED             : August 19, 2014
INVENTOR(S)       : Ki-hong Im It is certified that error appears in the above-identified patent and that said Letters Patent is hereby corrected as shown below:

In the Claims

Column 14, Line 11, In Claim 25, delete "of the a" and insert -- of the --, therefor.

Signed and Sealed this
Fifth Day of January, 2016

Michelle K. Lee
*Director of the United States Patent and Trademark Office*